(12) United States Patent
Ogawa et al.

(10) Patent No.: US 12,145,445 B2
(45) Date of Patent: Nov. 19, 2024

(54) SYNCHRONOUS MACHINE DRIVE CONTROL DEVICE, AND VEHICLE EQUIPPED WITH SYNCHRONOUS MACHINE SUBJECTED TO DRIVE CONTROL BY SAID SYNCHRONOUS MACHINE DRIVE CONTROL DEVICE

(71) Applicant: Mitsubishi Electric Corporation, Tokyo (JP)

(72) Inventors: Yasufumi Ogawa, Tokyo (JP); Yoshihiko Kimpara, Tokyo (JP); Daiki Matsuura, Tokyo (JP); Jun Kitagawa, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 1078 days.

(21) Appl. No.: 16/960,598

(22) PCT Filed: Apr. 16, 2018

(86) PCT No.: PCT/JP2018/015660
§ 371 (c)(1),
(2) Date: Jul. 8, 2020

(87) PCT Pub. No.: WO2019/202625
PCT Pub. Date: Oct. 24, 2019

(65) Prior Publication Data
US 2020/0331335 A1  Oct. 22, 2020

(51) Int. Cl.
*B60K 6/26* (2007.10)
*B60K 6/48* (2007.10)
(Continued)

(52) U.S. Cl.
CPC ............... *B60K 6/26* (2013.01); *B60K 6/48* (2013.01); *B60L 15/20* (2013.01); *B60L 15/32* (2013.01);
(Continued)

(58) Field of Classification Search
CPC ...... B60K 2006/268; B60K 2006/4825; B60K 6/26; B60K 6/387; B60K 6/46;
(Continued)

(56) References Cited

U.S. PATENT DOCUMENTS

2004/0061461 A1   4/2004   Tajima et al.

FOREIGN PATENT DOCUMENTS

DE   10 2013 212 310 A1   12/2014
DE   10 2015 202 594 A1   8/2016
(Continued)

OTHER PUBLICATIONS

Communication dated Jun. 21, 2021, issued by the German Patent Office in application No. 11 2018 007 480.3.
(Continued)

*Primary Examiner* — Charles J Han
(74) *Attorney, Agent, or Firm* — Sughrue Mion, PLLC; Richard C. Turner

(57) ABSTRACT

A synchronous machine drive control device such that a rotation angle correction amount can be detected even when a synchronous machine is rotating at high speed, and the rotation angle correction amount can be detected over a wide range, is obtained. A rotation angle correction amount calculation unit that calculates a correction amount of a rotation angle of a synchronous machine is included in an inverter control device, and the correction amount of the rotation angle is calculated based on a current detected by a current sensor by a three-phase short circuit being implemented in a state wherein the synchronous machine is rotating.

7 Claims, 6 Drawing Sheets

(51) Int. Cl.
- *B60L 15/20* (2006.01)
- *B60L 15/32* (2006.01)
- *B60L 50/51* (2019.01)
- *H02P 23/00* (2016.01)
- *H02P 27/06* (2006.01)
- *B60K 6/46* (2007.10)

(52) U.S. Cl.
CPC .............. *B60L 50/51* (2019.02); *H02P 23/00* (2013.01); *H02P 27/06* (2013.01); *B60K 2006/268* (2013.01); *B60K 6/46* (2013.01); *B60K 2006/4825* (2013.01); *B60L 2220/14* (2013.01); *B60L 2220/42* (2013.01); *B60L 2240/429* (2013.01); *B60Y 2200/91* (2013.01); *B60Y 2200/92* (2013.01); *B60Y 2300/43* (2013.01); *B60Y 2300/60* (2013.01); *B60Y 2400/604* (2013.01); *B60Y 2400/61* (2013.01)

(58) Field of Classification Search
CPC .. B60K 6/48; B60K 6/52; B60L 15/20; B60L 15/32; B60L 2220/14; B60L 2220/42; B60L 2240/429; B60L 3/0061; B60L 50/51; B60L 7/003; B60Y 2200/91; B60Y 2200/92; B60Y 2300/43; B60Y 2300/60; B60Y 2400/604; B60Y 2400/61; H02P 21/26; H02P 21/36; H02P 23/00; H02P 27/06; H02P 3/12; Y02T 10/62; Y02T 10/64; Y02T 10/70

See application file for complete search history.

(56) References Cited

FOREIGN PATENT DOCUMENTS

| DE | 10 2016 214 831 A1 | | 2/2018 |
|----|----|----|----|
| JP | 2001211698 A | * | 8/2001 |
| JP | 2004-129359 A | | 4/2004 |
| JP | 2013005582 A | * | 1/2013 |
| JP | 2015020733 A | * | 2/2015 |

OTHER PUBLICATIONS

International Search Report of PCT/JP2018/015660 dated Jul. 17, 2018 [PCT/ISA/210].

Communication dated Aug. 31, 2021 from the Japanese Patent Office in Application No. 2020-514796.

Notification of Reasons for Refusal dated Apr. 21, 2023 from the Chinese Patent Office in application No. 201880092100.8.

Chinese Office Action dated Sep. 13, 2023 in Chinese Application No. 201880092100.8.

Office Action issued Jan. 6, 2024 in Chinese Application No. 201880092100.8.

\* cited by examiner

FIG.6
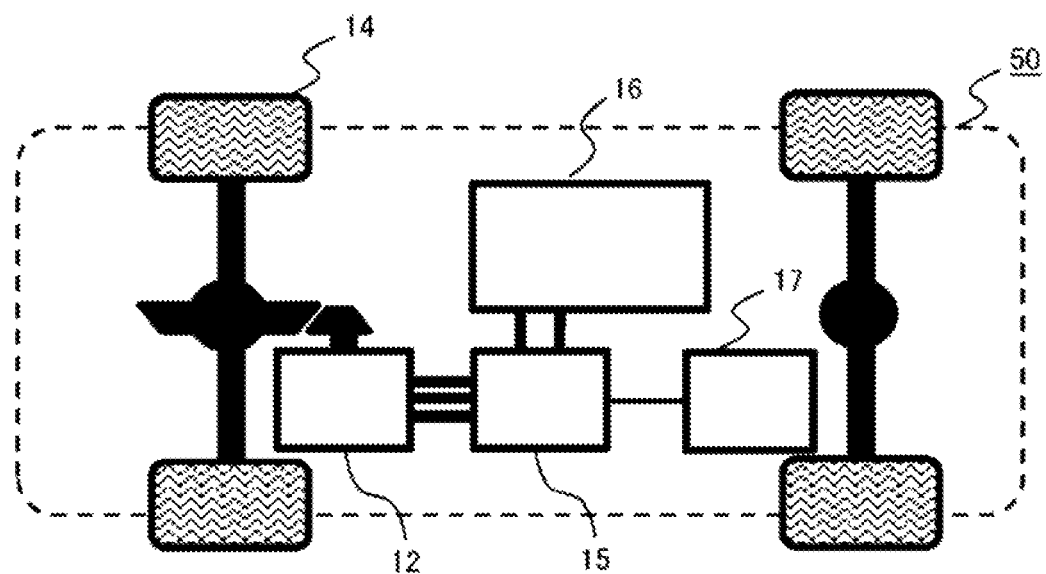
FIG.7A TORQUE
FIG.7B ROTATION SPEED
FIG.7C THREE-PHASE SHORT CIRCUIT COMMAND
FIG.7D ROTATION ANGLE CORRECTION AMOUNT
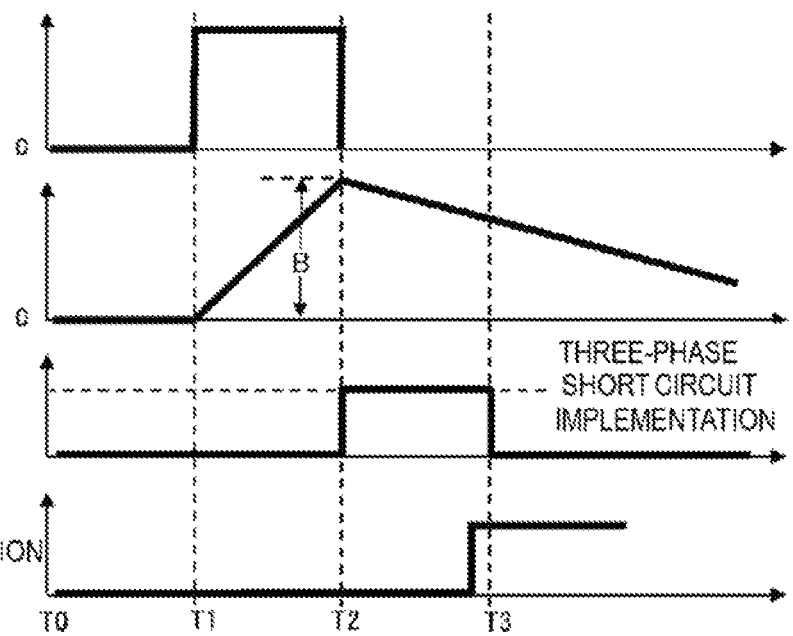

SYNCHRONOUS MACHINE DRIVE CONTROL DEVICE, AND VEHICLE EQUIPPED WITH SYNCHRONOUS MACHINE SUBJECTED TO DRIVE CONTROL BY SAID SYNCHRONOUS MACHINE DRIVE CONTROL DEVICE

CROSS REFERENCE TO RELATED APPLICATIONS

This application is a National Stage of International Application No. PCT/JP2018/015660, filed Apr. 16, 2018.

TECHNICAL FIELD

The present application relates to a synchronous machine drive control device that controls a drive of a synchronous machine mounted in a vehicle, and to a vehicle equipped with a synchronous machine subjected to a drive control by the synchronous machine drive control device.

BACKGROUND ART

In recent years, owing to an increase in environmental awareness and with a view to a future depletion of oil resources, there has been a demand for a reduction in fuel consumption in vehicles such as automobiles. Also, remarkable progress has been seen in rechargeable batteries, typified by lithium ion batteries, and there have been extensive trials to electrify traveling power, as with electric vehicles or hybrid vehicles.

A synchronous machine is used in an electric vehicle or a hybrid vehicle with an object of driving the vehicle or with an object of implementing power generation. As there is a need to implement current energization in synchronization with an angle of rotation of a rotor, a rotation angle sensor is provided in the synchronous machine, and there are many cases in which a resolver or the like is used as the rotation angle sensor.

In order to cause the synchronous machine to operate with high efficiency, there is a need for a magnetic pole position to be detected with high accuracy by the rotation angle sensor, but due to variation and the like when manufacturing synchronous machines, there are cases in which the magnetic pole position detected by the rotation angle sensor deviates with respect to the actual magnetic pole position.

In response to this. Patent Literature 1 discloses that, in a state wherein a synchronous machine is rotating in accordance with an engine, a d-axis current and a q-axis current are set to zero, a rotation angle correction amount is calculated from command voltage information at the time, and at a time of normal use, the angle of rotation is corrected using the rotation angle correction amount, and used.

CITATION LIST

Patent Literature

PTL 1: JP-A-2004-129359

SUMMARY OF INVENTION

Technical Problem

A control device disclosed in Patent Literature 1 is such that an induced voltage increases in a region in which the synchronous machine rotates at a high speed, because of which there is a need to energize with the d-axis current set to a negative value, as described in Paragraph 0031 of Patent Literature 1. Because of this, there is a problem in that the d-axis current and the q-axis current are not in a zero state when there is high-speed rotation, and calculation of the rotation angle correction amount cannot be implemented. Because of this, there is a problem in that calculation of the rotation angle correction amount can only be implemented in a state wherein the rotation speed is low, and timing of calculating the rotation angle correction amount is limited.

The present application has been made to solve the above problem and an object of the present application is to provide a synchronous machine drive control device such that a rotation angle correction amount can be detected even when a synchronous machine is rotating at high speed, and the rotation angle correction amount can be detected over a wide range, and of providing a vehicle equipped with a synchronous machine subjected to a drive control by the synchronous machine drive control device.

Solution to Problem

A synchronous machine drive control device disclosed in the present application is a synchronous machine drive control device that carries out a drive control of a synchronous machine. The synchronous machine drive control device includes a current detection device that detects a three-phase current, a power converter, and a control device having a rotation angle correction amount calculator that calculates a correction amount of a rotation angle of the synchronous machine and controlling the power converter. The correction amount of the rotation angle is calculated based on a current detected by the current detection device by a three-phase short circuit being implemented in a state wherein the synchronous machine is rotating.

Advantageous Effects of Invention

According to the synchronous machine drive control device disclosed in the present application, a rotation angle correction amount can be detected even when the synchronous machine is rotating at high speed, and the rotation angle correction amount can be detected over a wide range.

Objects, features, aspects, and advantages of the present application other than those heretofore described will become more apparent from the following detailed description, which refers to the accompanying drawings.

BRIEF DESCRIPTION OF DRAWINGS

FIG. 6 is a drawing illustrating a second embodiment, and shows another embodiment of the vehicle equipped with the synchronous machine subjected to the drive control by the synchronous machine drive control device according to the first embodiment.

FIG. 7A to FIG. 7D is are time charts of a rotation angle correction amount calculation by a synchronous machine drive control device mounted in a vehicle shown in FIG. 6.

DESCRIPTION OF EMBODIMENTS

Figure 1:
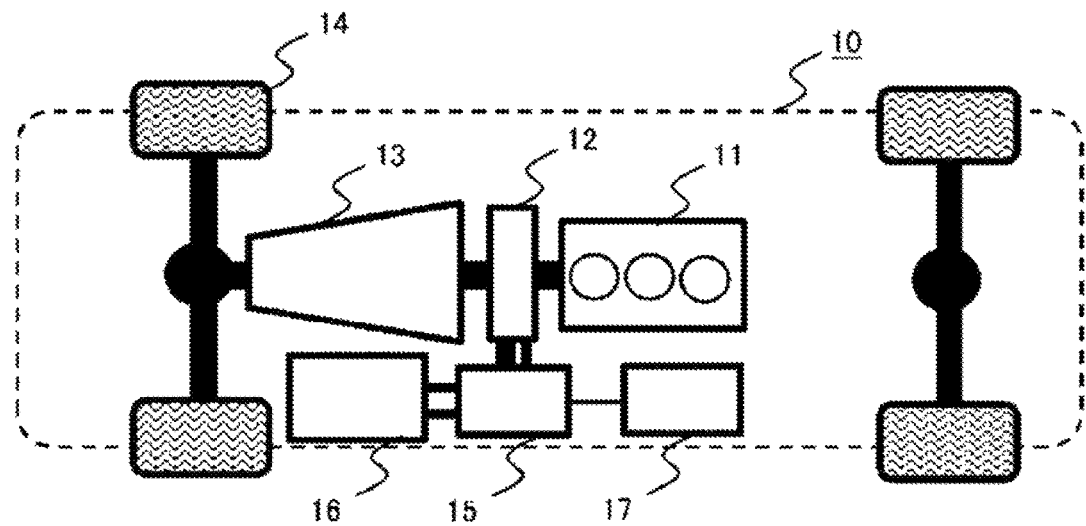
FIG. 1 is a drawing showing a vehicle equipped with a synchronous machine subjected to a drive control by a synchronous machine drive control device according to a first embodiment.

Hereafter, preferred embodiments of a synchronous machine drive control device according to the present application, and of a vehicle equipped with a synchronous machine subjected to a drive control by the synchronous machine drive control device, will be described using the drawings. In the drawings, identical reference signs indicate identical or corresponding portions.

First Embodiment

FIG. 1 is a drawing showing an embodiment of a vehicle equipped with a synchronous machine subjected to a drive control by a synchronous machine drive control device according to a first embodiment.

In FIG. 1, reference sign 10 indicates a vehicle, which is a parallel hybrid vehicle equipped with an engine 11 and a synchronous machine 12. The synchronous machine 12 is mechanically coupled to both a transmission 13 and the engine 11. Starting of the engine 11, or driving of a drive shaft 14, is carried out using torque generated by the synchronous machine 12.

A synchronous machine drive control device 15 converts direct current power of a battery 16 into alternating current power, and outputs the converted alternating current power to the synchronous machine 12. The battery 16 is configured of, for example, a lithium ion rechargeable battery, wherein a battery with a voltage of in the region of 300V is used. A vehicle control device (hereafter called an ECU) 17 calculates torque to be generated by the synchronous machine 12 based on information from an accelerator position sensor, a brake pedal operation, a wheel speed sensor, or the like (not shown).

The ECU 17 is connected to the synchronous machine drive control device 15 by communication means (for example, a CAN (control area network)), and transmits a torque command to the synchronous machine drive control device 15 using communication. Also, a determination of whether or not to implement a rotation angle correction amount calculation for the synchronous machine 12 is carried out by the ECU 17 in accordance with a state of the vehicle 10. The determination of whether or not to implement the rotation angle correction amount calculation for the synchronous machine 12 may be carried out by the ECU 17, or may be carried out by the synchronous machine drive control device 15. The drive shaft 14 is configured of a tire, a drive shaft, a differential gear, and the like. An output shaft of the transmission 13 is mechanically coupled to the drive shaft 14. Torque generated by the synchronous machine 12 or the engine 11 is input via an input shaft of the transmission 13, reduced by a gear (not shown), and transmitted to the drive shaft 14.

Figure 2:
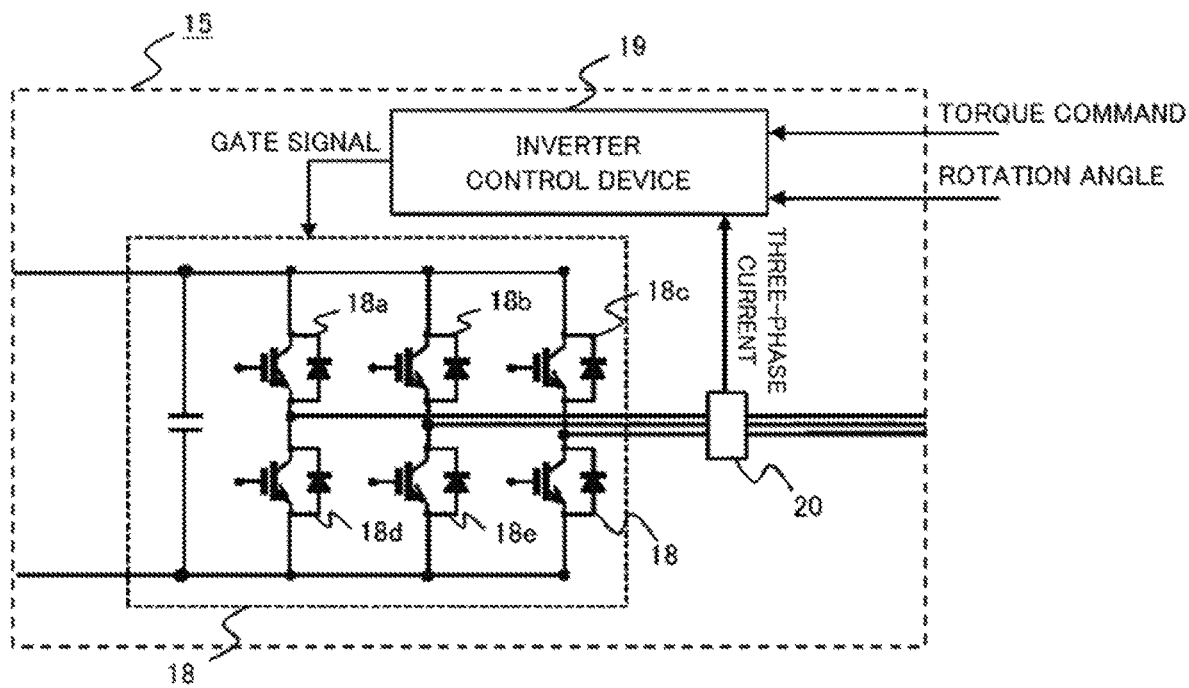
FIG. 2 is a drawing showing details of the synchronous machine drive control device according to the first embodiment.

FIG. 2 is a drawing showing details of the synchronous machine drive control device 15. The synchronous machine drive control device 15 includes an inverter 18, which is a power conversion device, an inverter control device 19, which is a control device of the inverter 18, and a current sensor 20.

The inverter control device 19 calculates a gate signal for the inverter 18 so that a torque command issued from the ECU 17 can be realized. The inverter 18 normally includes six switching elements, those being switching elements 18a to 18c, called upper arm switching elements, and switching elements 18d to 18f, called lower arm switching elements. IGBTs, MOSFETs, or the like are used as the switching elements 18a to 18f, and the switching elements 18a to 18f carry out a switching operation in accordance with a gate signal calculated by the inverter control device 19, thereby applying a voltage to the synchronous machine 12. The current sensor 20 measures a current with which the synchronous machine 12 is energized.

Figure 3:
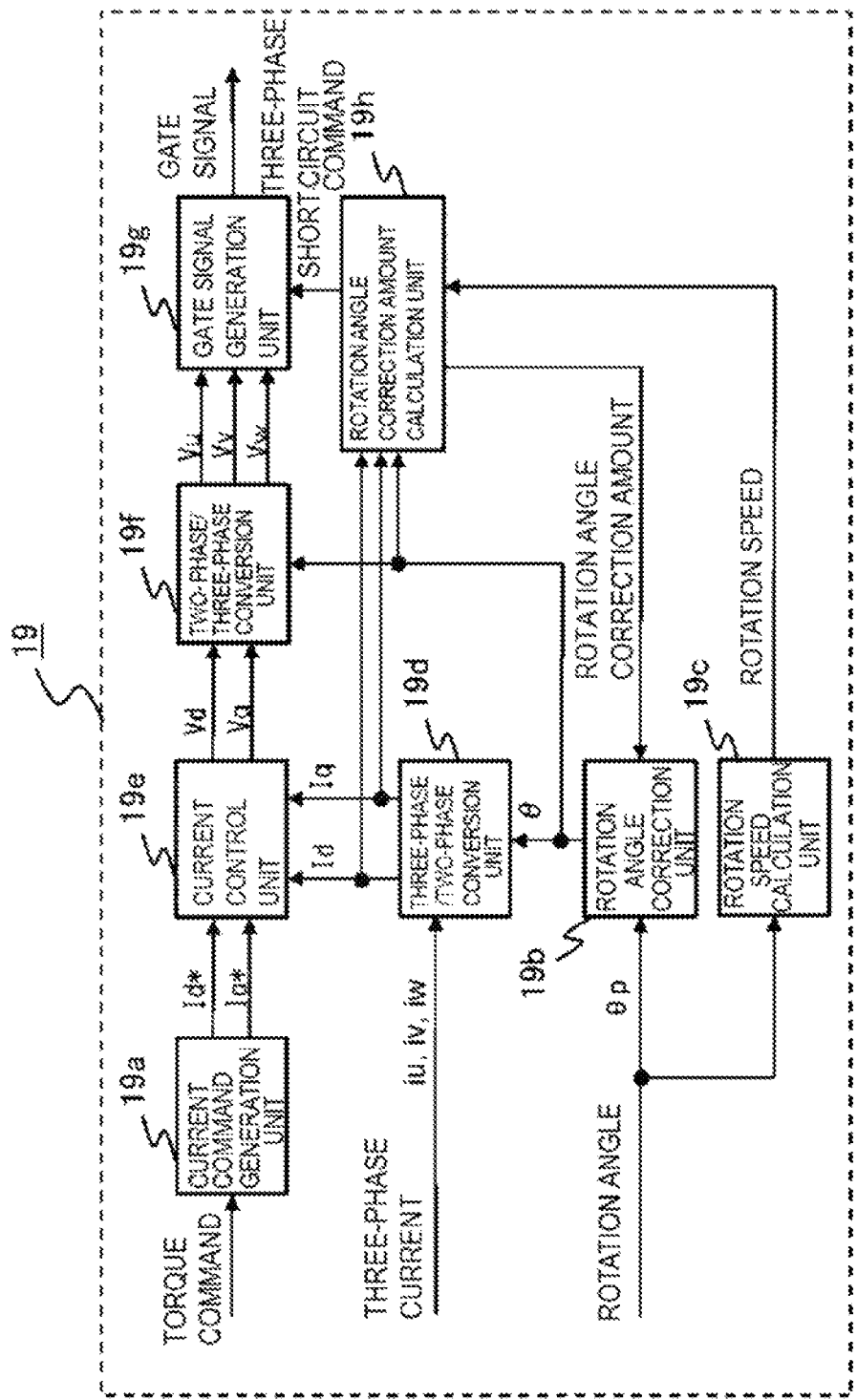
FIG. 3 is a detailed view of an inverter control device shown in FIG. 2.

FIG. 3 is a drawing showing details of the inverter control device 19. The inverter control device 19 includes a current command generation unit 19a, a rotation angle correction unit 19b, a rotation speed calculation unit 19c, a three-phase/two-phase conversion unit 19d, a current control unit 19e, a two-phase/three-phase conversion unit 19f, a gate signal generation unit 19g, and a rotation angle correction amount calculation unit 19h.

The current command generation unit 19a generates a d-axis current command value Id* and a q-axis current command value Iq* that can realize a torque command received from the ECU 17. The rotation angle correction unit 19b calculates a rotation angle θ from a detected value obtained using a position sensor (not shown) of a rotation angle detection device that is provided in the synchronous machine 12 and detects a rotation angle, that is, a position sensor rotation angle θp, and a rotation angle correction amount obtained using the rotation angle correction amount calculation unit 19h. For example, the rotation angle θ is obtained by adding the rotation angle correction amount to the position sensor rotation angle θp. The rotation speed calculation unit 19c calculates a rotation speed by differentiating an angle of rotation of the synchronous machine 12. Specifically, an amount of rotation angle change in 1 ms is divided by a time interval (1 ms).

The three-phase/two-phase conversion unit 19d calculates a d-axis current Id and a q-axis current Iq from three phases of current iu, iv, and iw detected by the current sensor 20, which is a current detection device that detects a three-phase current. The current control unit 19e implements a control calculation so that the d-axis current Id and the q-axis current Iq calculated by the three-phase/two-phase conversion unit 19d comply with the d-axis current command value Id* and the q-axis current command value Iq* generated by the current command generation unit 19a, and calculates a d-axis voltage command Vd and a q-axis voltage command Vq. PI control or the like is applied in the current control unit 19e.

The two-phase/three-phase conversion unit 19f calculates a u-phase voltage command Vu, a v-phase voltage command Vv, and a w-phase voltage command Vw from the d-axis voltage command Vd and the q-axis voltage command Vq calculated by the current control unit 19e and the rotation angle θ calculated by the rotation angle correction unit 19b. The gate signal generation unit 19g generates a gate signal so that the u-phase voltage command Vu, the v-phase voltage command Vv, and the w-phase voltage command Vw calculated by the two-phase/three-phase conversion unit 19f can be output. A pulse width modulation utilizing, for example, a triangular wave, or the like, is applied in this process. Also, when a three-phase short circuit command is issued from the rotation angle correction amount calculation unit 19h, the gate signal generation unit 19g implements a three-phase short circuit that turns off all of the upper arm switching elements 18a to 18c of the inverter 18, and turns on all of the lower arm switching elements 18d to 18f. Although the lower arm switching elements 18d to 18f are turned on here, the upper arm and the lower arm may be reversed.

The rotation angle correction amount calculation unit 19h determines whether or not to implement a correction amount calculation based on a rotation speed calculated by the rotation speed calculation unit 19c, a correction amount calculation permission signal from the ECU 17, or the like. Also, when determining that the correction amount calculation is to be implemented, the rotation angle correction amount calculation unit 19h outputs a three-phase short circuit command to the gate signal generation unit 19g. Subsequently, the rotation angle correction amount calculation unit 19h calculates the rotation angle correction amount from the d-axis current and q-axis current phases in a state wherein the three-phase short circuit has been implemented.

Figure 4:
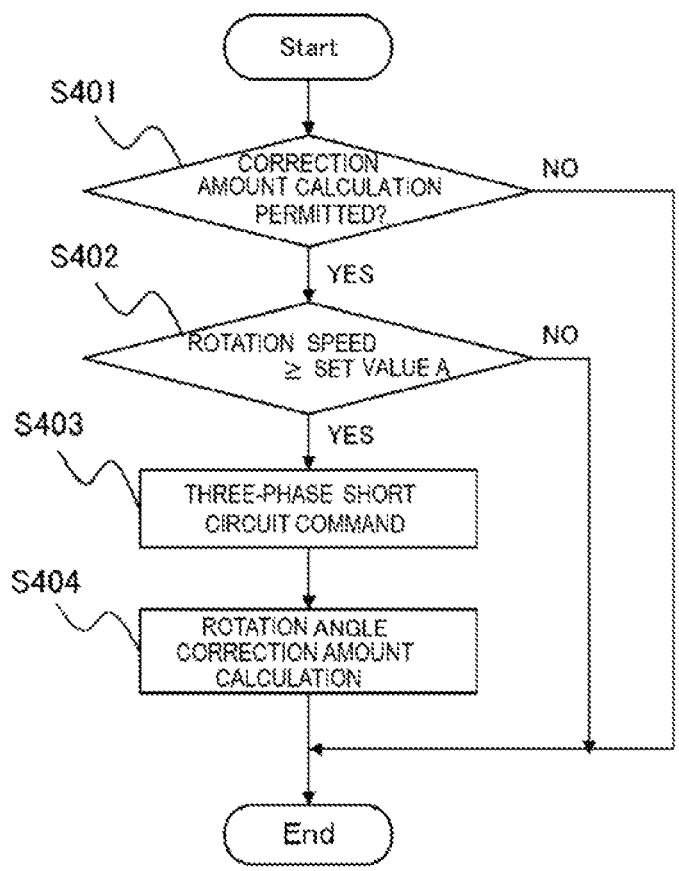
FIG. 4 is a flowchart showing an operation of a rotation angle correction amount calculation unit shown in FIG. 3.

FIG. 4 is a flowchart showing an operation of the rotation angle correction amount calculation unit 19h. This process is implemented in a fixed cycle of, for example, 1 ms.

Firstly, in step S401, the rotation angle correction amount calculation unit 19h confirms whether a correction amount calculation is permitted by the ECU 17. Information is transmitted from the ECU 17 using communication such as a CAN communication. The correction amount calculation permission is granted in a state wherein, for example, the vehicle 10 is being driven by the engine 11. Herein, the rotation angle correction amount calculation unit 19h proceeds to step S402 when the correction amount calculation is permitted, and ends the process when this is not the case.

In step S402, the rotation angle correction amount calculation unit 19h confirms whether a rotation speed is equal to or greater than a set value A. The rotation angle correction amount calculation unit 19h proceeds to step S403 when the rotation speed is equal to or greater than the set value A, and ends the process when the rotation speed is less than the set value A.

In step S403, the rotation angle correction amount calculation unit 19h outputs a three-phase short circuit command to the gate signal generation unit 19g, whereby a three-phase short circuit is implemented. The phases of current flowing through the synchronous machine 12 change together with the rotational speed of the synchronous machine 12 when the three-phase short circuit is implemented, with the q-axis current becoming practically zero, and a negative d-axis current being caused to flow, when the rotation speed is high. As the current phases change together with the rotational speed in this way, the rotation angle correction amount can be calculated utilizing this characteristic.

In Step S404, the rotation angle correction amount calculation unit 19h calculates a rotation angle correction amount from the d-axis current Id and the q-axis current Iq, and outputs the calculated rotation angle correction amount to the rotation angle correction unit 19b. The rotation angle correction unit 19b calculates the rotation angle θ using the calculated rotation angle correction amount.

Figure 5:
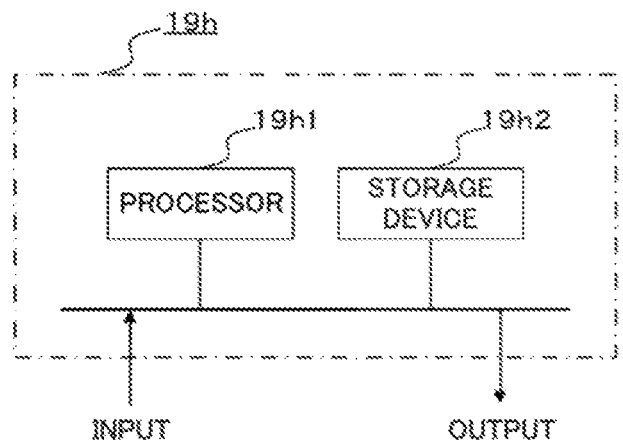
FIG. 5 is a drawing showing a hardware example of the rotation angle correction amount calculation unit shown in FIG. 3.

The rotation angle correction amount calculation unit 19h is configured of a processor 19h1 and a storage device 19h2, as shown in a hardware example in FIG. 5. Although not shown, the storage device 19h2 includes a volatile storage device such as a random access memory and a non-volatile auxiliary storage device such as a flash memory. Alternatively, an auxiliary storage device of a hard disk may be included instead of the flash memory. The processor 19h1 executes a program input from the storage device 19h2. In this case, the program is input from the auxiliary storage device into the processor 19h1 via the volatile storage device. Also, the processor 19h1 may output data such as a calculation result to the volatile storage device of the storage device 19h2, or may save the data in the auxiliary storage device via the volatile storage device.

According to the synchronous machine drive control device according to the first embodiment, as heretofore described, a rotation angle correction amount can be obtained even when the synchronous machine 12 rotates at high speed, because of which there is an advantage in that timings of obtaining a correction amount increase. Also, it is known that rotational fluctuation caused by engine torque fluctuation or the like decreases when there is high speed rotation, and there is an advantage in that there is little effect from rotational fluctuation, and accuracy is good. The rotation angle correction amount calculated in this way is such that correction values may be successively changed by the rotation angle correction unit 19b. Also, when a position sensor that detects the angle of rotation of the synchronous machine 12 is not defective, the rotation angle correction amount is a numeral within a predetermined range, because of which a rotation angle sensor failure diagnosis can be carried utilizing this characteristic.

Second Embodiment

Next, another embodiment of the vehicle equipped with the synchronous machine subjected to the drive control by the synchronous machine drive control device according to the first embodiment will be described. FIG. 6 is a drawing showing another embodiment of the vehicle equipped with the synchronous machine subjected to the drive control by the synchronous machine drive control device according to the first embodiment.

In FIG. 6, reference sign 50 indicates a vehicle, which is an electric vehicle wherein power accumulated in the battery 16 is converted into mechanical energy by the synchronous machine 12, thereby driving the vehicle 50. The synchronous machine 12 is mechanically coupled to the drive shaft 14. Torque generated by the synchronous machine 12 is reduced by a gear ratio of the drive shaft 14, and transmitted to the tire.

As the vehicle 50 according to the second embodiment is such that the synchronous machine 12 is mechanically coupled to the drive shaft 14 in this way, a configuration is such that an external force is exerted on the drive shaft 14 via the tire, whereby the synchronous machine 12 rotates together with the drive shaft 14. The synchronous machine drive control device 15 converts direct current power of the battery 16 into alternating current power, and supplies the converted alternating current power to the synchronous machine 12. As the configuration of the synchronous machine drive control device 15 is the same as in the first embodiment, a detailed description will be omitted.

A lithium ion battery or the like is used as the battery 16, wherein a battery with a voltage of in the region of 300V is used. Also, the ECU 17 calculates torque to be generated by the synchronous machine 12 based on information from an accelerator position sensor, a brake pedal operation, a wheel speed sensor, or the like (not shown), and issues a command to the synchronous machine drive control device 15 using communication means (for example, a CAN (control area network)).

The vehicle 50 is such that a drive force is applied to the drive shaft 14 from an exterior, causing the drive shaft 14 or the synchronous machine 12 to rotate. The drive force from the exterior may be equipment such as a chassis dynamometer, or a drive force may be applied using a downhill road or the like. Even in a state wherein the synchronous machine 12 is rotating owing to a drive force from the exterior in this way, a three-phase short circuit can be implemented, and a rotation angle correction amount can be calculated based on the current phases at the time. By adopting this kind of method, tge rotation angle correction amount can be calculated even when no power source other than the synchronous machine 12, such as an engine, is provided in the vehicle 50. Also, when obtaining the rotation angle correction amount by driving the synchronous machine 12 using external force from a chassis dynamometer in a manufacturing process of the vehicle 50, the rotation angle correction amount can be obtained even at a high rotational speed, because of which implementation in various inspection processes is enabled, and freedom of process design increases.

FIG. 7A to FIG. 7D is are time charts for when implementing a rotation angle correction. In the vehicle 50 shown in FIG. 6, torque is generated by the synchronous machine 12, causing the synchronous machine 12 and the drive shaft 14 to rotate, after which a three-phase short circuit is implemented when the synchronous machine 12 is coasting, and the rotation angle correction amount is obtained. The rotation angle correction amount is obtained by a rotation angle correction amount calculation unit 19$h$.

FIG. 7A is a time chart showing torque generated by the synchronous machine 12, FIG. 7B is a time chart showing the rotational speed of the synchronous machine 12, FIG. 7C is a three-phase short circuit command, which is an output of the rotation angle correction amount calculation unit 19$h$, and FIG. 7D is a time chart showing the rotation angle correction amount calculated by the rotation angle correction amount calculation unit 19$h$.

In FIG. 7A to FIG. 7D, from a time T0 to a time T1, it is a waiting state wherein torque is zero. The synchronous machine 12 is caused to generate torque from the time T1 to a time T2, causing the rotational speed of the synchronous machine 12 to rise. At the time T2, at a timing at which the rotational speed is confirmed to have reached a set value B or greater, the torque is reduced to zero, causing the synchronous machine 12 to coast. Also, a three-phase short circuit command is implemented at the timing of the time T2, starting a calculation of the rotation angle correction amount. The set value B is set with consideration to a coasting time and a time for calculating the rotation angle correction amount. At a time T3, it is confirmed that the rotation angle correction amount has been calculated, and the three-phase short circuit command is stopped.

According to the second embodiment, as heretofore described, learning can be implemented when the synchronous machine 12 is rotating at high speed, whereby time for the synchronous machine 12 to coast (from the time T2 onward) can be secured, and the correction amount calculation can be carried out during the coasting. Also, a power source other than the synchronous machine 12, such as an engine, is unnecessary, in addition to which equipment such as a chassis dynamometer that applies a drive force from the exterior is unnecessary, because of which a calculation of the rotation angle correction amount can also be carried out at a company retailing the vehicle 50, or the like. For example, provided that the details of FIG. 6 are implemented in a state wherein the drive shaft 14 is suspended by jacking up, the rotation angle correction amount can be obtained with the vehicle 50 in a stopped state, and the correction amount can be obtained while saving space.

Third Embodiment

Figure 8:
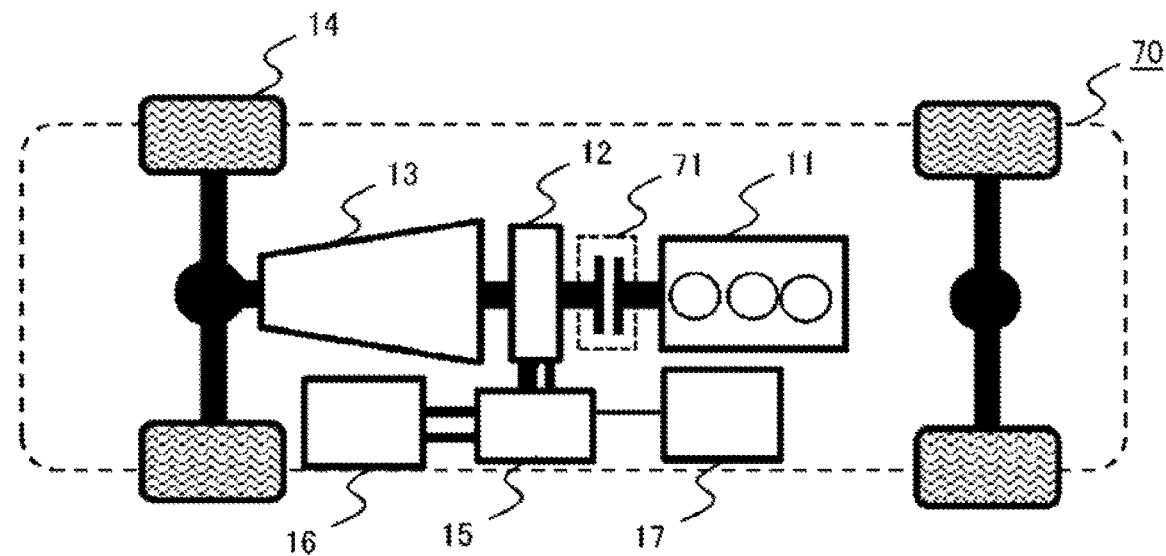
FIG. 8 is a drawing illustrating a third embodiment, and shows still another embodiment of the vehicle equipped with the synchronous machine subjected to the drive control by the synchronous machine drive control device according to the first embodiment.

Next, still another embodiment of the vehicle equipped with the synchronous machine subjected to the drive control by the synchronous machine drive control device according to the first embodiment will be described. FIG. 8 is a drawing showing still another embodiment of the vehicle equipped with the synchronous machine subjected to the drive control by the synchronous machine drive control device according to the first embodiment.

In FIG. 8, reference sign 70 indicates a vehicle, which is a parallel hybrid vehicle equipped with the engine 11, the synchronous machine 12, the transmission 13, and the battery 16. The synchronous machine 12 is mechanically coupled to the transmission 13. Also, the synchronous machine 12 is of a configuration mechanically coupled to the engine 11 via a clutch 71.

The synchronous machine drive control device 15 converts direct current power of the battery 16 into alternating current power, and supplies the converted alternating current power to the synchronous machine 12. As the configuration of the synchronous machine drive control device 15 is the same as in the first embodiment, a detailed description will be omitted.

A lithium ion battery or the like is used as the battery 16, wherein a battery with a voltage of in the region of 300V is used. The ECU 17 calculates torque to be generated by the synchronous machine 12 based on information from an accelerator position sensor, a brake pedal operation, a wheel speed sensor, or the like (not shown), and issues a command to the synchronous machine drive control device 15 using communication means (for example, a CAN (control area network)).

The drive shaft 14 is configured of a tire, a drive shaft, a differential gear, and the like. The output shaft of the transmission 13 is mechanically coupled to the drive shaft 14. Torque generated by the synchronous machine 12 or the engine 11 is input via the input shaft of the transmission 13, reduced by a gear (not shown), and transmitted to the drive shaft 14. Generally, a clutch that can sever a mechanical coupling of the input shaft and the output shaft is incorporated in the transmission 13. Also, the engine 11 is coupled to the synchronous machine 12 via the clutch 71. The clutch 71 switches between disengagement and engagement. The disengagement and engagement of the clutch 71 is implemented using a transmission controller (not shown) or the like.

This kind of configuration is such that the clutch incorporated in the transmission 13 and the clutch 71 are disengaged, and the synchronous machine 12 is caused to generate torque, whereby the synchronous machine 12 attains a rotating state. A three-phase short circuit is implemented in this state, whereby a rotation angle correction amount can be obtained. By the clutch incorporated in the transmission 13 or the clutch 71 being disengaged before causing torque to be generated by the synchronous machine 12 in this way, the synchronous machine 12 can be caused to rotate even when the vehicle 70 is in a stopped state, and the rotation angle correction amount can be obtained. Consequently, the rotation angle correction amount can be obtained in a limited space.

Fourth Embodiment

Figure 9:
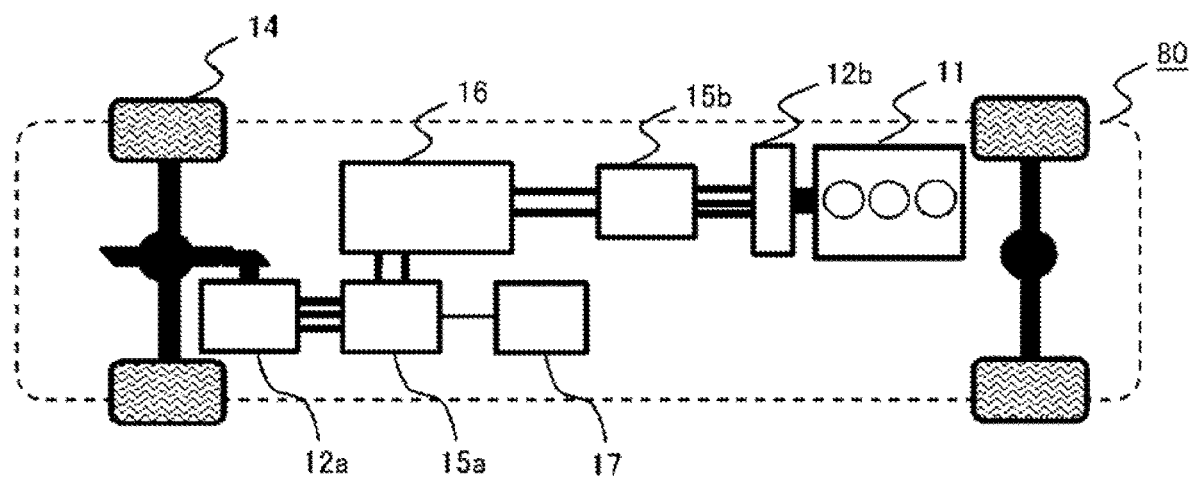
FIG. 9 is a drawing illustrating a fourth embodiment, and shows still another embodiment of the vehicle equipped with the synchronous machine subjected to the drive control by the synchronous machine drive control device according to the first embodiment.

Next, another embodiment of the vehicle equipped with the synchronous machine subjected to the drive control by the synchronous machine drive control device according to the first embodiment will be described. FIG. 9 is a drawing showing another embodiment of the vehicle equipped with the synchronous machine subjected to the drive control by the synchronous machine drive control device according to the first embodiment.

In FIG. 9, reference sign 80 indicates a vehicle, which is a series hybrid vehicle including a first synchronous machine 12a coupled to the drive shaft 14 and a second synchronous machine 12b coupled to the engine 11. The first synchronous machine 12a is mechanically coupled to the drive shaft 14. Torque generated by the first synchronous machine 12a is reduced by the gear ratio of the drive shaft 14, and transmitted to the tire.

A first synchronous machine drive control device 15a converts direct current power of the battery 16 into alternating current power, and supplies the converted alternating current power to the first synchronous machine 12a. As a configuration of the first synchronous machine drive control device 15a is the same as that of the synchronous machine drive control device 15 described in the first embodiment, a detailed description will be omitted.

A lithium ion battery or the like is used as the battery 16, wherein a battery with a voltage of in the region of 300V is used. The ECU 17 calculates torque to be generated by the first synchronous machine 12a based on information from an accelerator position sensor, a brake pedal operation, a wheel speed sensor, or the like (not shown), and issues a command to the first synchronous machine drive control device 15a using communication means (for example, a CAN (control area network)). Also, the ECU 17 decides an amount of power to be generated by the second synchronous machine 12b, and issues a command regarding torque to be generated by the second synchronous machine 12b.

The drive shaft 14 is driven by the first synchronous machine 12a. A configuration of a second synchronous machine drive control device 15b is the same as that of the first synchronous machine drive control device 15a, and is provided in order to control torque of the second synchronous machine 12b. Also, the engine 11 and the second synchronous machine 12b are mechanically coupled.

This kind of configuration is such that a rotational speed of the engine 11 is set to a predetermined rotational speed by an unshown engine control device. At this time, the mechanically coupled second synchronous machine 12b attains a rotating state. A three-phase short circuit of the second synchronous machine 12b is implemented in the rotating state, whereby a rotation angle correction amount can be obtained.

Also, according to this embodiment, the rotation angle correction amount of the second synchronous machine 12b can be obtained when there is high speed rotation. When there is high speed rotation, there is an advantage in that rotational speed fluctuation caused by torque fluctuation in the engine 11 decreases, because of which accuracy increases. Also, by controlling the rotational speed of the engine 11, the range of rotational speed to be adjusted can be limited, and repeatability of the rotation angle correction amount is good, and can be accurately obtained.

Fifth Embodiment

Figure 10:
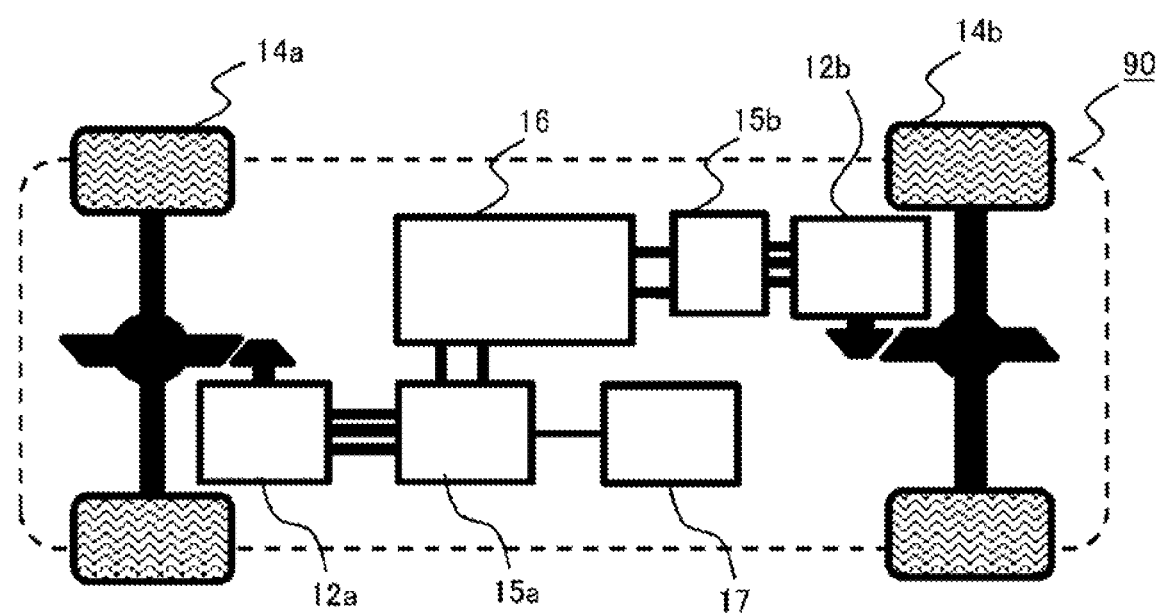
FIG. 10 is a drawing illustrating a fifth embodiment, and shows still another embodiment of the vehicle equipped with the synchronous machine subjected to the drive control by the synchronous machine drive control device according to the first embodiment.

Next, another embodiment of the vehicle equipped with the synchronous machine subjected to the drive control by the synchronous machine drive control device according to the first embodiment will be described. FIG. 10 is a drawing showing another embodiment of the vehicle equipped with the synchronous machine subjected to the drive control by the synchronous machine drive control device according to the first embodiment.

In FIG. 10, reference sign 90 indicates a vehicle, which is a four-wheel drive electric vehicle including a front wheel first drive shaft 14a, a rear wheel second drive shaft 14b, the first, synchronous machine 12a, and the second synchronous machine 12b.

The first synchronous machine 12a is mechanically coupled to the first drive shaft 14a, and the second synchronous machine 12b is mechanically coupled to the second drive shaft 14b. Also, the first drive shaft 14a is driven by the first synchronous machine 12a, and the second drive shaft 14b is driven by the second synchronous machine 12b.

The first synchronous machine drive control device 15a converts direct current power of the battery 16 into alternating current power, and supplies the alternating current power to the first synchronous machine 12a, and the second synchronous machine drive control device 15b converts direct current power of the battery 16 into alternating current power, and supplies the alternating current power to the second synchronous machine 12b. As the configurations of the first synchronous machine drive control device 15a and the second synchronous machine drive control device 15b are each the same as that of the synchronous machine drive control device 15 of the first embodiment, a detailed description will be omitted.

A lithium ion battery or the like is used as the battery 16, wherein a battery with a voltage of in the region of 300V is used. The ECU 17 calculates torque to be generated by the first synchronous machine 12a and torque to be generated by the second synchronous machine 12b based on information from an accelerator position sensor, a brake pedal operation, a wheel speed sensor, or the like (not shown), and issues a command to each of the first synchronous machine drive control device 15a and the second synchronous machine drive control device 15b using communication means (for example, a CAN (control area network)).

This kind of configuration is such that when driving using only the first synchronous machine 12a, the second synchronous machine 12b is in a rotating state. A rotation angle correction amount can be obtained by implementing a three-phase short circuit of the second synchronous machine 12b in this state.

Also, according to this embodiment, the rotation angle correction amount of the second synchronous machine 12b can be obtained when there is high speed rotation, because of which the rotation angle correction amount can also be obtained at a high vehicle speed. Also, as the rotation angle correction amount can be obtained at a high vehicle speed, a frequency with which the rotation angle correction amount is obtained can be increased, and rotation angle correction, or failure diagnosis and the like, can be implemented at a high frequency.

In this embodiment, a case wherein an electric vehicle is driver, using the first synchronous machine 12a has been described, but the same advantages can be obtained when the electric vehicle is driven using the second synchronous machine 12b. Also, the case of a four-wheel drive electric vehicle has been described, but the same advantages can be obtained in a case wherein two or more synchronous machines for driving a drive shaft are provided, such as in a series-parallel hybrid vehicle. Also, the three-phase short circuit is such that all upper arm or lower arm switching elements may be turned on, or the same advantages are obtained by generating a zero vector by switching.

Although the present application is described above in terms of various exemplary embodiments and implementations, it should be understood that the various features, aspects, and functionality described in one or more of the individual embodiments are not limited in their applicability to the particular embodiment with which they are described, but instead can be applied, alone or in various combinations, to one or more of the embodiments.

It is therefore understood that numerous modifications which have not been exemplified can be devised without departing from the scope of the present application. For example, at least one of the constituent components may be modified, added, or eliminated. At least one of the constituent components mentioned in at least one of the preferred embodiments may be selected and combined with the constituent components mentioned in another preferred embodiment.

REFERENCE SIGNS LIST

10, 50, 70, 80, 90 vehicle, 11 engine, 12 synchronous machine, 12a first synchronous machine, 12b second synchronous machine, 13 transmission, 14 drive shaft, 14a first drive shaft, 14b second drive shaft, 15 synchronous machine drive control device, 15a first synchronous machine drive control device, 15b second synchronous machine drive control device, 16 battery, 17 vehicle control device (ECU), 18 inverter, 18a to 18f switching element, 19 control device (inverter control device), 19a current command generation unit, 19b rotation angle correction unit, 19c rotation speed calculation unit, 19d three-phase/two-phase conversion unit, 19e current control unit, 19f two-phase/three-phase conversion unit, 19g gate signal generation unit, 19h rotation angle correction amount calculation unit, 19h1 processor, 19h2 storage device, 20 current sensor, 71 clutch.

The invention claimed is:

1. A synchronous machine drive control device that carries out a drive control of a synchronous machine, the synchronous machine drive control device comprising:
   a current detection device that detects a three-phase current;
   a power converter; and
   a control device having a rotation angle correction amount calculator that calculates a correction amount of a rotation angle of the synchronous machine and controlling the power converter, wherein
   the rotation angle correction amount calculator determines whether a rotation speed of the synchronous machine is equal to or greater than a predetermined value and outputs a three-phase short circuit command based on the rotation speed being equal to or greater than the predetermined value,
   the correction amount of the rotation angle is calculated based on a current detected by the current detection device by a three-phase short circuit being implemented in a state wherein the synchronous machine is rotating, and
   the three-phase short circuit is implemented based on the three-phase short circuit command being output by the rotation angle correction amount calculator and all of upper arm switching elements being turned off and all of lower arm switching elements being turned on in the power converter such that a q-axis current becomes practically zero and a negative d-axis current flows.

2. A vehicle, comprising:
   an engine;
   the synchronous machine drive control device according to claim 1; and
   a synchronous machine subjected to a drive control by the synchronous machine drive control device, wherein
   the synchronous machine is coupled to a drive shaft of the vehicle and the engine, the vehicle is caused to travel by a drive force of the engine, and the correction amount of the rotation angle is obtained with the synchronous machine in a rotating state.

3. A vehicle, comprising:
   the synchronous machine drive control device according to claim 1; and
   a synchronous machine subjected to a drive control by the synchronous machine drive control device, wherein
   the synchronous machine is coupled to a drive shaft of the vehicle, the drive shaft is caused to rotate by an external force, and the correction amount of the rotation angle is obtained with the synchronous machine in a rotating state.

4. A vehicle, comprising:
   the synchronous machine drive control device according to claim 1; and
   a synchronous machine subjected to a drive control by the synchronous machine drive control device, wherein
   the synchronous machine is coupled to a drive shaft of the vehicle, the drive shaft is caused to rotate and subsequently to coast by a drive force of the synchronous machine, and the correction amount of the rotation angle is obtained with the synchronous machine in a rotating state.

5. A vehicle, comprising:
   the synchronous machine drive control device according to claim 1; and
   a synchronous machine subjected to a drive control by the synchronous machine drive control device, wherein
   the synchronous machine is coupled to a drive shaft of the vehicle via a clutch, the drive shaft is caused to rotate and subsequently to coast by a drive force of the synchronous machine, and the correction amount of the rotation angle is obtained with the synchronous machine in a rotating state.

6. A vehicle, comprising:
   an engine;
   the synchronous machine drive control device according to claim 1; and
   a synchronous machine subjected to a drive control by the synchronous machine drive control device, wherein
   the synchronous machine is coupled to the engine, and the correction amount of the rotation angle is obtained with the synchronous machine put into a rotating state by a rotational speed of the engine being controlled.

7. A vehicle, comprising:
   the synchronous machine drive control device according to claim 1; and a synchronous machine subjected to a drive control by the synchronous machine drive control device, wherein
a drive shaft of the vehicle is configured of a multiple of drive shafts, the synchronous machine comprising a plurality of synchronous machines coupled to each of the drive shafts, and by the vehicle being driven by one of the plurality of synchronous machines, the correction amount of the rotation angle is obtained with a remaining one of the plurality of synchronous machines in a rotating state.

* * * * *